March 14, 1944.　　J. HENCHERT ET AL　　2,344,303
CONTAINER SIDE SEAM SEALING COMPOUND APPLYING APPARATUS
Filed April 5, 1943　　6 Sheets-Sheet 2
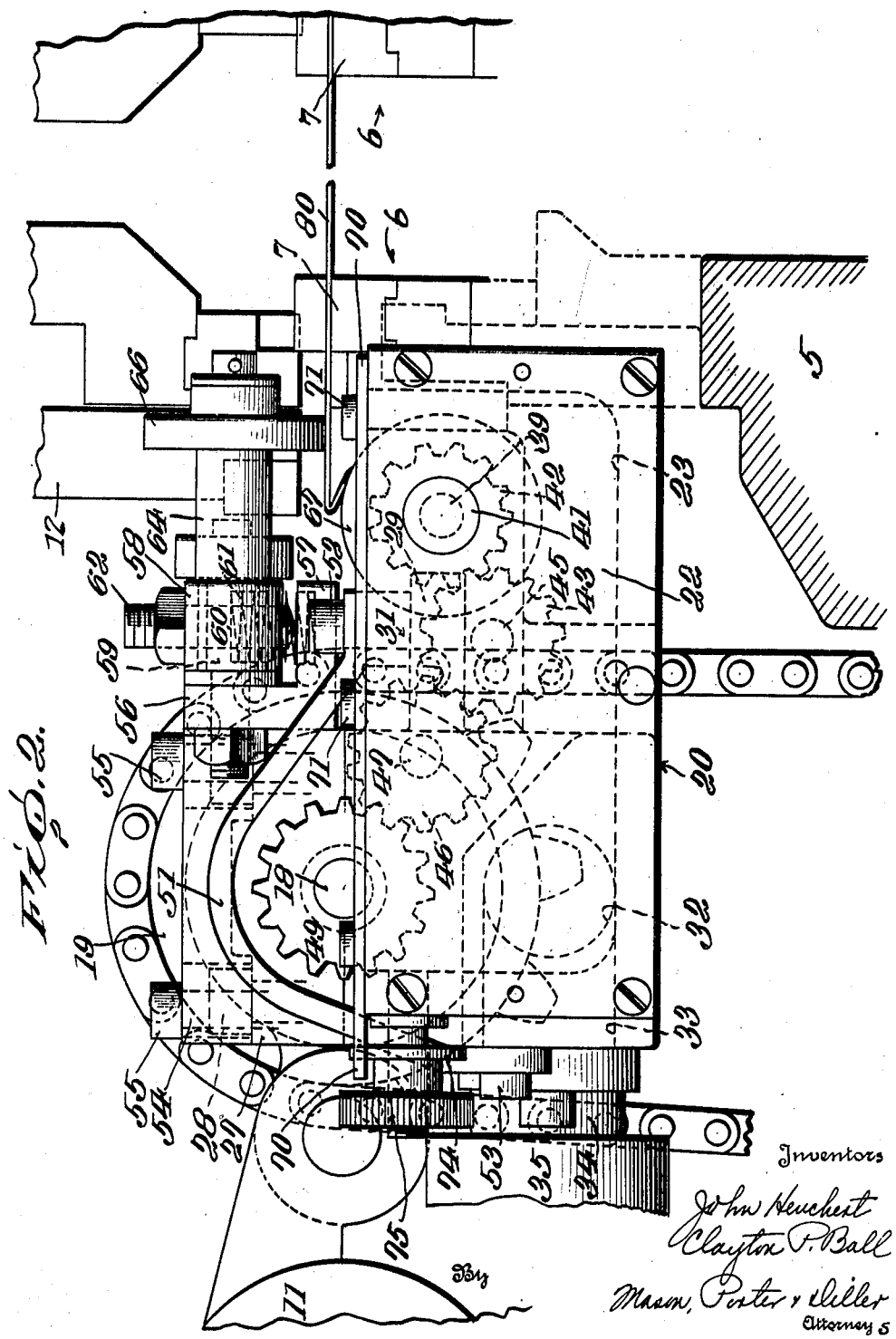

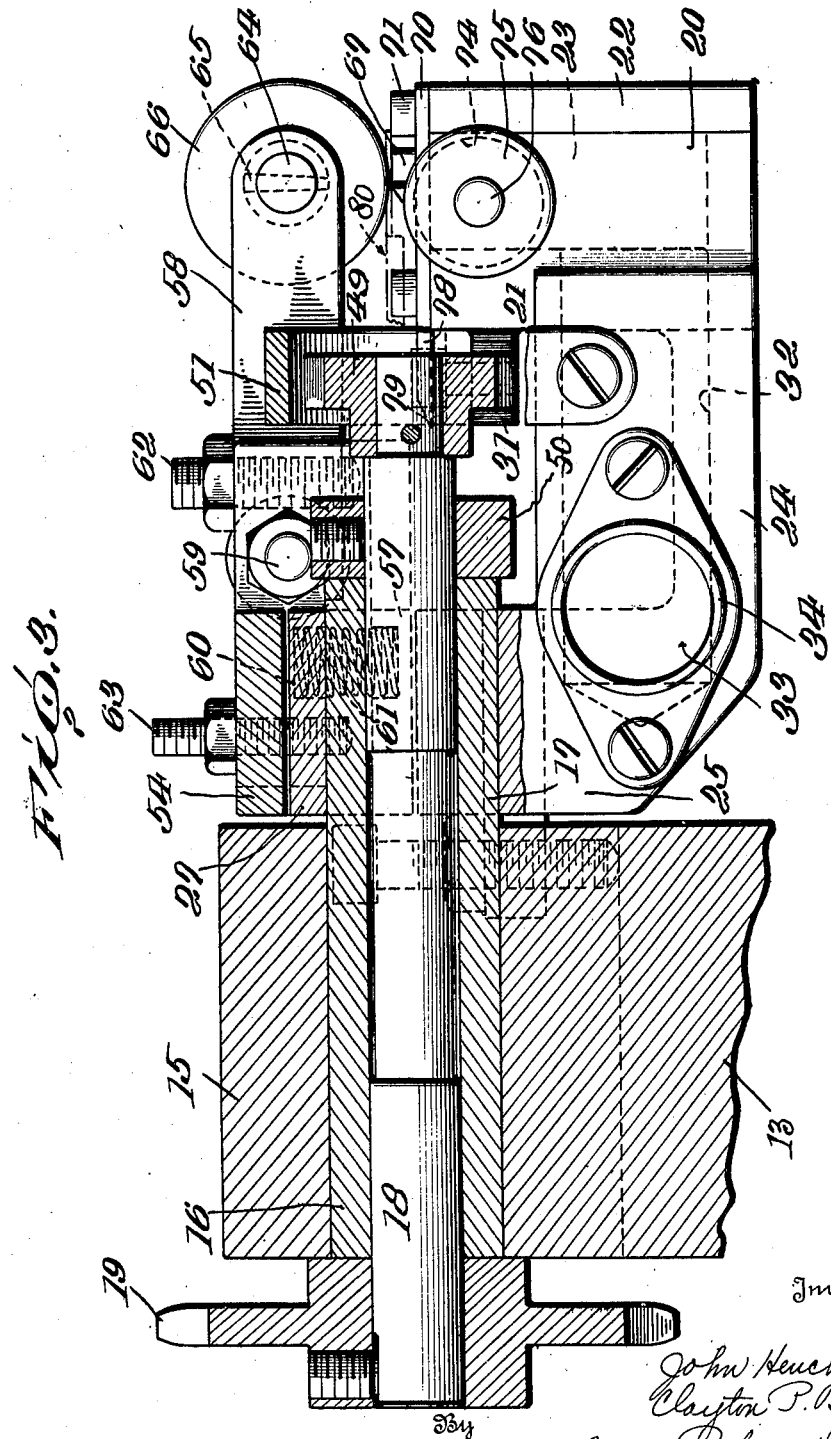

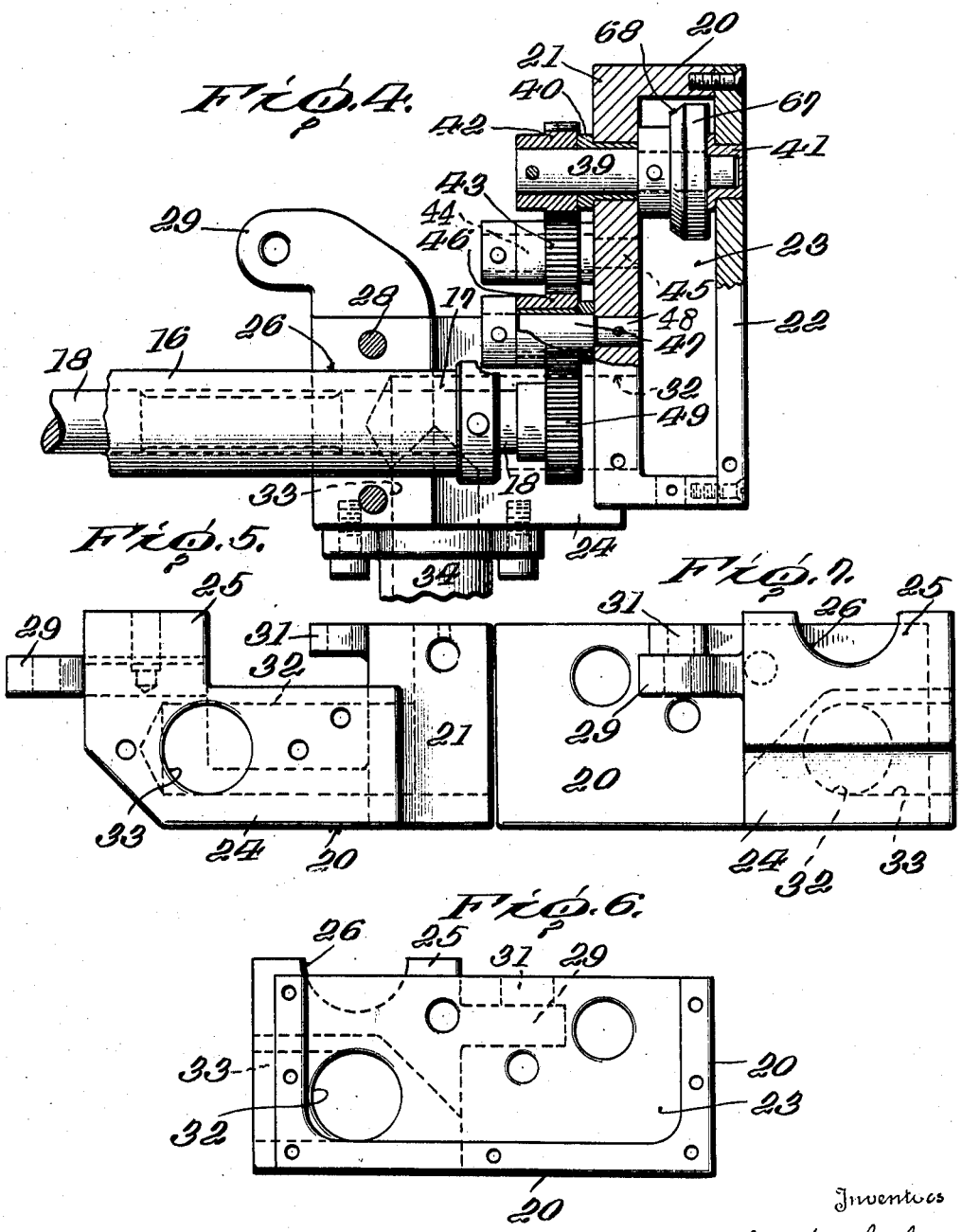

March 14, 1944.   J. HENCHERT ET AL   2,344,303
CONTAINER SIDE SEAM SEALING COMPOUND APPLYING APPARATUS
Filed April 5, 1943   6 Sheets-Sheet 5
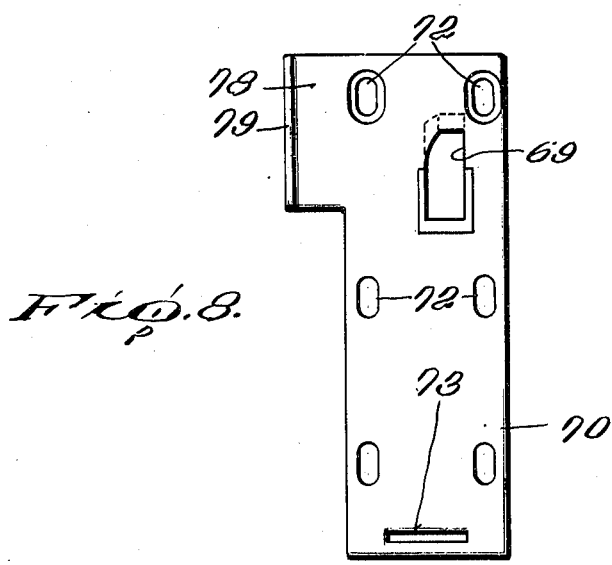
Fig. 8.
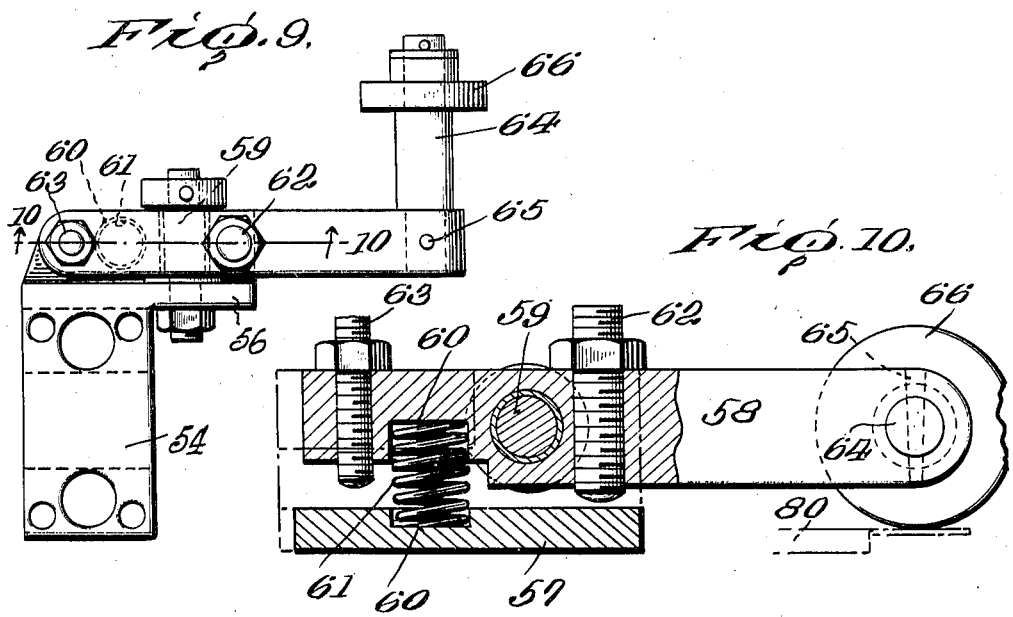
Fig. 9.
Fig. 10.
Inventors
John Henchert
Clayton P. Ball
By Mason, Porter & Diller
Attorneys

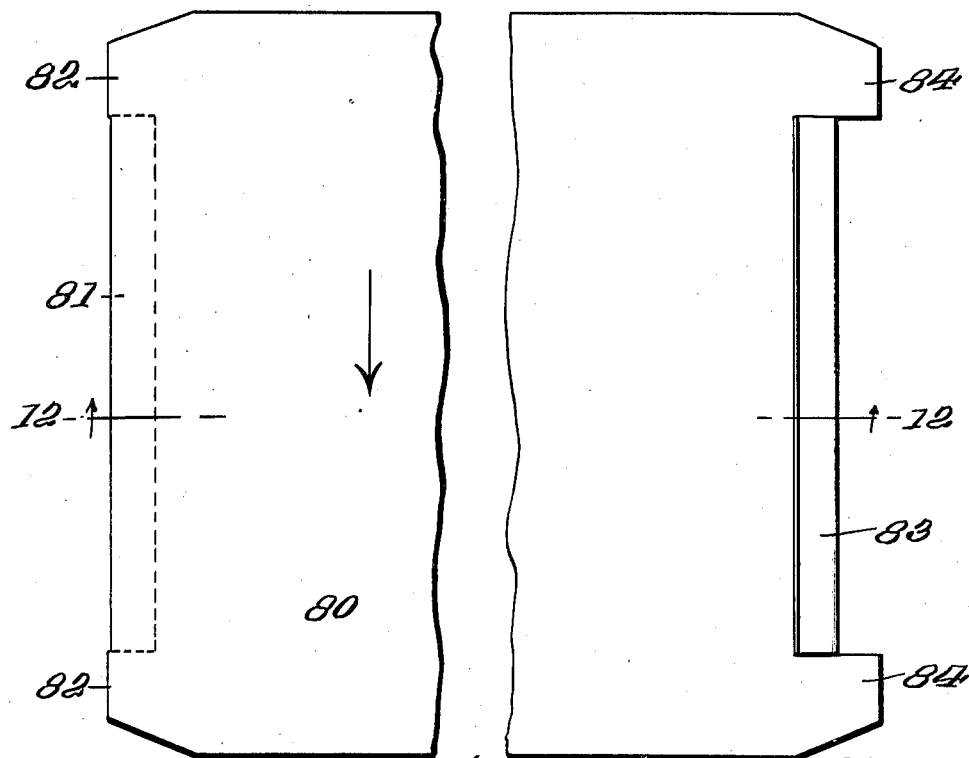
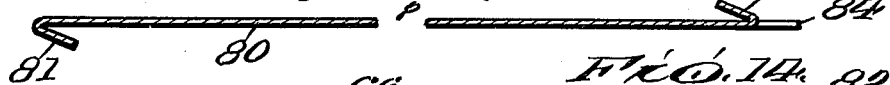
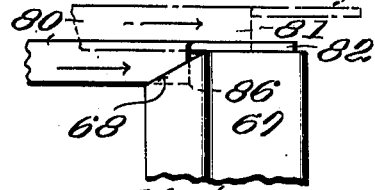
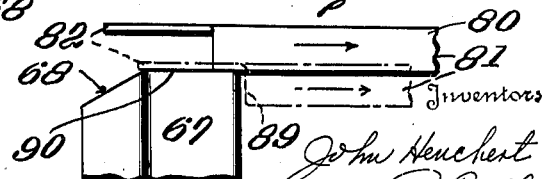
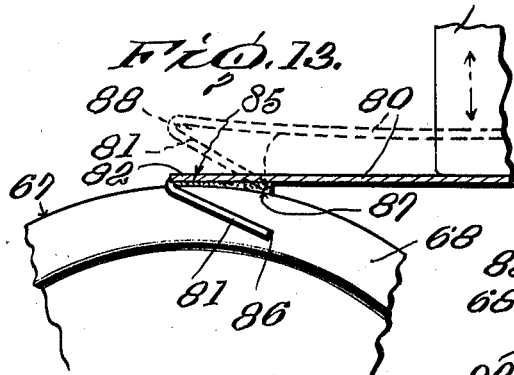

Patented Mar. 14, 1944

2,344,303

UNITED STATES PATENT OFFICE 2,344,303

CONTAINER SIDE SEAM SEALING COMPOUND APPLYING APPARATUS

John Henchert and Clayton P. Ball, Chicago, Ill., assignors to Continental Can Company, Inc., New York, N. Y., a corporation of New York Application April 5, 1943, Serial No. 481,922

14 Claims. (Cl. 91—51)

The invention relates generally to the art of manufacturing metallic containers having side seams of the hook and lap type and it primarily seeks to provide in a container body maker a novel seam sealing compound or dope applying apparatus capable of so applying the dope or seam sealing compound to the body blanks as they are being fed to the forming station that both the lock and lap portions of the formed seams will have the dope or compound incorporated therein and an efficient seam seal will be provided without resorting to the usual step of solder bonding.

While the invention is not limited in practical application to incorporation in any single form of body maker, and can be used in machines in which the blanks are folded either upwardly or downwardly about the forming horn, it is well adapted to incorporation in machines of the well known Troyer-Fox type which have developed from the structures disclosed in U. S. Letters Patent to Troyer, et al. 1,772,820, issued August 12, 1930. In the Troyer-Fox type machine the can body blanks are withdrawn one by one from a supply stack and are fed, station by station, along supporting ways, certain operations being performed thereon at the several stations. At one station the blanks are fed from a low level laterally through rolls designed to break the grain in the metal in order to facilitate the subsequent shaping or forming of the bodies and then are returned again to the supporting ways at a higher level. At another station the lateral edges of the blanks are notched and slit in a manner for facilitating the formation of the well known lock and lap seam. At another station the edge hooks which are to be interlocked in the formation of the lock and lap seam are partially formed, and at still another station the formation of these hooks is completed. The blanks are then fed to the body shaping station at which the blanks are shaped about a stub horn and have the hooks thereof interlocked and bumped in the well known manner to complete the formation of the bodies, after which the soldering of the side seams thus formed usually is accomplished. It is the purpose of the present invention to provide novel apparatus for applying a seam sealing compound or dope to the body blanks in position for sealing the seams and enabling completion of the seams with the bumping thereof, that is, without soldering, and said novel apparatus is incorporated in the machine between the hook completing station and the forming and bumping station and is designed to apply the dope or sealing compound to the inside of the outside hook and on the laps adjacent said outside hook.

It is known that efforts have been made to apply sealing compound or dope to container body side seams prior to applicants' disclosure, and in fact it has been proposed heretofore to apply such coatings by drag contact of an applicator roller with body blank edge portions, but no prior structures are known which have been capable of satisfactorily applying seam sealing compound or dope to the hook and also the lap portions of traveling body blanks.

In its more detailed nature the invention resides in providing a novel seam dope or sealing compound applying apparatus including a receptacle mountable on a body maker between the hook forming and body shaping and seam bumping stations, and a roller applicator rotatable in a plane traversing the line of feed of the container blanks so as to be engageable with hook and lap portions of the blanks at one side edge portion thereof, said roller having a cylindrical applicator surface terminating at its end nearest the shaping and bumping station with an abrupt shoulder and merging at its other end into a beveled portion whereby as said blank side edge portions move therepast each thereof will first have its leading lap portion contacted by the cylindrical roller surface and be coated thereby, then its hook will engage the beveled surface and be lifted so that the hook edge extremity will drag against the cylindrical roller surface and cause the hook to pick up coating from said roller surface, and then the trailing end of said hook will abruptly drop over thhe abrupt shoulder and cause the trailing lap portion to engage and be coated by the cylindrical roller surface.

An object of the invention is to provide in an apparatus of the character stated an applicator roller having a generally cylindriform applicator surface terminating at one end in an abrupt drop shoulder and merging at its other end into a lift bevel.

Another object of the invention is to provide in apparatus of the character stated means for yieldably holding the body blank edge portions against the applicator roller as the lap and hook portions thereof are being coated.

Another object of the invention is to provide in apparatus of the character stated novel means for varying the thickness of the coating film on the applicator roller.

With the above and other objects in view that will hereinafter appear, the nature of the invention will be more fully understood by following the detailed description, the appended claims and the several views illustrated in the accompanying drawings.

In the drawings:

Figure 2 is a fragmentary vertical cross section of the body maker feedway at the position of the dope applying apparatus, the latter being shown in elevation.

Figure 3 is a vertical longitudinal section taken on the line 3—3 on Figure 1.

Figure 4 is a plan view of the dope receptacle housing, parts being broken away and in horizontal section.

Figure 5 is a side elevation of the housing shown in Figure 4.

Figure 1:
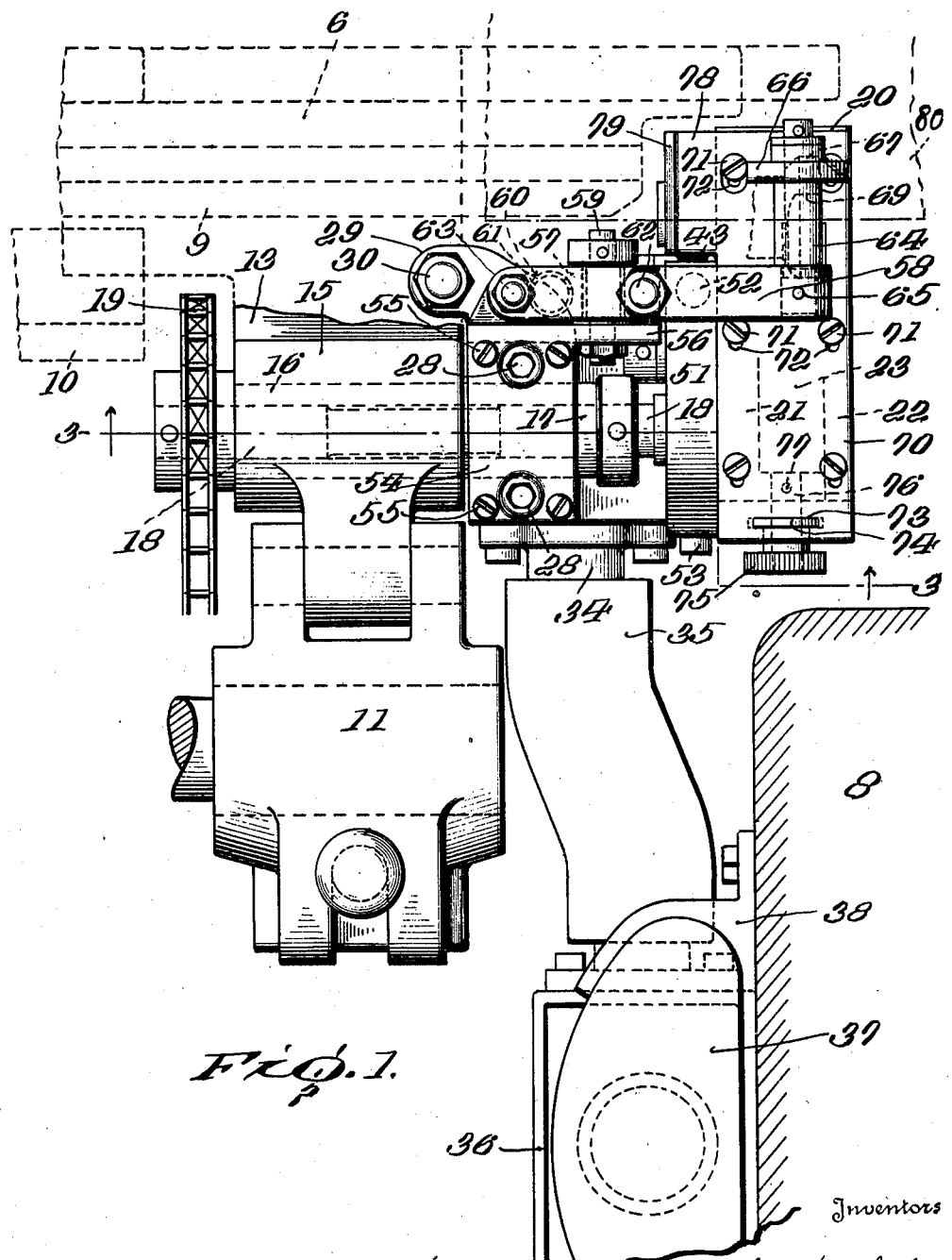
Figure 1 is a fragmentary plan view illustrating the invention, portions of adjacent framing parts of the body maker on which the apparatus is mounted also being shown.

Figures 6 and 7 respectively illustrate the housing of Figure 4 in front and rear end elevation.

Figure 8 is a plan view of the dope housing cover plate.

Figure 9 is a detail plan view of the presser roller supporting arm and the bracket whereon said arm is pivotally mounted, said bracket being removed from its mounting.

Figure 10 is a vertical longitudinal section taken on the line 10—10 on Figure 9.

Figure 11 is a plan view illustrating a can body blank.

Figure 12 is a cross section on the line 12—12 on Figure 11.

Figure 13 is an enlarged fragmentary cross sectional view illustrating how the dope applicator roller applies dope to the laps on the body blank in full lines, the application of dope to the hook being illustrated in dotted lines.

Figures 14 and 15 are fragmentary longitudinal sectional views respectively illustrating the application of dope to the leading and trailing laps.

In the example of embodiment of the invention herein illustrated 5 generally designates the right-hand housing of a body maker of the well known Troyer-Fox type which has developed from the structure disclosed in U. S. Letters Patent to Troyer et al. 1,772,820, issued August 12, 1930. In this type of body maker there are included the usual container blank feedways one of which is herein generally designated 6, and feed devices generally designated 7 for feeding the body blanks over said feedways to a point under the frame arch generally designated 8 at which station the blanks are bent downwardly about the stub horn to cause the blank hooks to interlock and form a side seam, the seam being bumped in the well known manner after the hooks become properly interlocked.

In certain of the figures of the drawings one of the usual hook forming steels is generally designated 9, and one of the usual oscillatable second stage hook formers is indicated and generally designated 10. The frame bearing in which the blank clamp is rockably mounted at the particular side of the machine is generally designated 11, the clamp also being indicated and generally designated 12. The bearing 11 is formed in the usual manner in a lateral extension frame portion 13 of the right-hand housing which has been generally designated 5. All of the above mentioned parts are conventional in body maker structures of the character stated and in themselves form no part of the present invention.

The housing extension frame portion 13 is provided with a bearing portion 15 in which a shaft bearing bushing 16 is fixed. The bushing extends at one end from the bearing portion 15, as at 17, the extension being toward the can body shaping and bumping station located beneath the frame arch 8.

A shaft 18 is rotatably mounted in the bearing bushing 16 and extends at each end therefrom. At the end of the shaft 18 remote from the frame arch 8 the shaft has a sprocket 19 affixed thereon, and this sprocket is adapted to be driven by a chain from the adjacent cam shaft of the machine or from any other suitable rotating part of the body maker.

A housing or receptacle 20 is provided for receiving the sealing compound or dope which is to be applied to the hook and lap portions of the traveling can body blanks, the form of this housing being illustrated in detail in Figures 4 through 7 of the drawings.

The housing or receptacle 20 has a rectangular main part 21 which is open at the top and also at the side, said open side being closed by a removable side plate 22 which cooperates with the other wall portions of the main body 21 in forming a rectangular sealing compound or dope retaining chamber 23. The housing 20 also includes a longitudinal extension 24 and an upper extension 25 in the latter of which there is a half bearing recess 26 shaped to partially embrace the extension 17 of the bearing bushing 16. A cap 27 is screw secured as at 28 to the extension 25 so as to complete the embracement of the bushing extension 17 and mount the housing 20 on said bushing extension. An ear 29 extends from the extension 25 in position for overlying the right-hand housing bearing portion 15, and an adjuster screw 30 is threadably mounted in said ear in position for engaging said bearing portion. It will be obvious that the screws 28 can be loosened and the housing 20 adjusted about the axis of the bushing extension 17. This adjustment of the housing can be effected by use of the adjuster screw 30.

The housing 20 also has a longitudinally extended support pad 31, and the purpose of this pad will become apparent as the description progresses.

A longitudinal compound supply duct 32 is provided in the housing extension 24, and a lateral duct 33 merges into said longitudinal duct and opens through the side of the housing extension 24 where a nipple fitting 34 is secured thereover. The nipple 34 is connected by a supply duct 35 with a feed reservoir 36 supplied with sealing compound or dope in the well known manner by an inverted bottle 37 supported as at 38 on the machine arch 8.

A shaft 39 is rotatably mounted in and across the housing or receptacle 21, 22 at the end thereof adjacent the path of travel of the can body blanks in a bearing bushing 40 mounted in the wall of the main housing 21 and in a cup bushing 41 mounted in the opposing removable side plate 22. A spur gear 42 is secured on the shaft outside the housing 21 and meshes with a spur gear 43 rotatable about a stud shaft secured as at 45 to said housing. The gear 43 in turn meshes with a spur gear 46 rotatable about a stud shaft 47 secured as at 48 to the housing 21 and which is in turn driven by a spur gear 49 secured on the end of the previously described shaft 18. A collar 50 is secured on the shaft 18 and cooperates with the sprocket 19 in preventing endwise movement of the shaft 18 in its bearing 16. A gear guard strip 51 is provided and is secured at one end as at 52 to the previously mentioned housing pad 31, and at its other end as at 53 to the housing extension 24 in position for overlying and guarding the train of gears 42, 43, 46 and 49 against contact.

A pivot bracket 54 is screw secured as at 55 over the cap 27 and is equipped with a longitudinal, vertical web extension 56 and a horizontal shelf portion 57. A presser roller supporting arm 58 is pivoted as at 59 to the vertical web 56 and overlies the shelf portion 57 parallel the line of feed of the body blanks. The upper surface of the shelf 57 and the under-surface of the arm 58 are recessed to form a spring socket 60 for receiving a compression spring 61, said spring being effective to constantly urge the end of the arm 58 which is extended in the direction in which the body blanks are fed downwardly. Adjustable screws 62 and 63 extend through the arm 58 at opposite sides of the pivotal mounting 59 and are engageable with the underlying shelf portion 57 in a manner for permitting limited rocking movement of the arm about its pivotal mounting.

A cross shaft 64 is secured as at 65 to the end of the arm 58 nearest the frame arch 8, and a presser roller 66 is freely rotatably mounted on the inwardly directed end of said arm in position for rotating in a plane paralleling the line of feed of the can body blanks and disposed inwardly of the lateral edge portion of the body blanks.

The lateral edge portions of the traveling body blanks pass centrally over an applicator roller 67 secured to the cross shaft 39 within the sealing compound or dope retaining chamber 23, said roller being partially immersed in the dope or sealing compound in said chamber. The roller terminates at the end thereof disposed in the direction of feed travel of the body blanks in an abrupt drop shoulder, and at its other end is equipped with a bevel lead 68.

The peripheral or effective upper portion of the applicator roller extends upwardly through a suitably shaped opening 69 in a cover plate 70 mounted over the open top of the receptacle 21, 22. The plate is secured to the receptacle by screws 71 passing through laterally elongated slots 72, and this plate also is equipped with a longitudinally extending slot 73 disposed parallel the direction of feed travel of the body blanks. The slot 73 is adapted to receive an adjuster flange 74 of a knurled nut 75 which is adjustably mounted on a screw 76 secured as at 77 in the end wall of the receptacle body 21 remote from the body blank feedway. It will be obvious that by loosening the screws 71 and adjusting the knurled nut 75 the cover plate may be moved so as to vary the spaced relation of the end of the plate opening nearest the body blank feedway and the adjacent periphery of the applicator roller 67, thereby to control to a nicety the thickness of the effective film of sealing compound or dope carried by said roller in position for being applied to the body blanks traveling thereover.

In order to facilitate passage of body blanks over the receptacle 20, 21 and its cover plate 70, said plate is provided with a longitudinal extension 78 which terminates in a downwardly turned or beveled edge portion 79 effective to assure against fouling contact of can body blanks with said receptacle, the cover plate or the associated gear train. In Figure 1 of the drawings the relative position of a traveling can body blank 80 and the applicator roller 67 is somewhat diagrammatically illustrated, and an understanding of the function and advantages of the herein disclosed sealing compound or dope applying apparatus will be better understood by referring to Figures 11 through 15 of the drawings. In Figures 11 and 12 of the drawings a conventional structure of body blank including hook and lap portions is illustrated, and in Figures 13 to 15 the operation of the peculiarly shaped applicator roller 67 in efficiently coating both the lap and hook portions of the body blanks is clearly illustrated.

A body blank is generally designated 80. These body blanks are fed in a horizontal position in body makers of the type hereinbefore referred to, the hooks at one side of the feedway being directed downwardly, and the hooks at the opposite side of the feedway being directed upwardly. The downwardly directed hooks which pass over the feedway portion on the right-hand housing 5, and which will form the inner hooks of the side seam, are designated 81, and the lap portions provided one at each end of this hook portion are designated 82. The upwardly directed hook portion at the opposite side of the blank is designated 83 and the associated lap portions at that side are designated 84.

It will be apparent by reference to Figures 1 and 2 of the drawings that the lateral edge portion of the blanks at the right-hand side of the machine pass substantially centrally over the underlying applicator roller 67. See especially Figure 13. As the leading end of each blank approaches the applicator roller the leading lap portion 82 thereof engages the upper peripheral surface of the roller and has sealing compound or dope applied thereto as at 87. This application of sealing compound or dope to the leading lap 82 continues until the leading end of the hook 81 engages the bevel 68 of the roller approximately at the point designated 86, or in other words until the coating of said lap portion is essentially completed, and then the hook will ride up on or be lifted by the bevel 68 so as to place the hook edge in drag contact against the top surface of the roller at or about the point 87 so as to collect sealing compound or dope from said roller surface as at 88. When the movement of the blank has progressed far enough to have completed the application of sealing compound or dope as at 88 to the hook 81, said hook drops abruptly off the abrupt end shoulder of the roller 67 as at 89 thereby to place the trailing lap portion 82 against the upper effective surface of the applicator roller 67 to be coated with sealing compound or dope thereby as indicated at 90.

In the foregoing description there is described a simple form of sealing compound or dope applying apparatus which is effective to efficiently apply the sealing compound or dope to the lap portions as well as to the hooks along one side of the body blanks in a manner for assuring efficient sealing of the can body side seams without the use of solder. While it is deemed unnecessary to do so, it will be obvious that sealing compound or dope apparatus of the type herein disclosed could be mounted at both sides of the body maker for applying the sealing compound or dope to the hooks and lap portions at both lateral edges of the body blanks should this be desired.

It is of course to be understood that the details of structure and the arrangement of parts may be variously changed and modified without departing from the spirit and scope of the invention.

We claim:

1. A sealing compound applying apparatus for body makers wherein container body blanks are fed along, each with a lateral edge thereof disposed in the direction of feed and equipped with a seam hook and a lap portion endwise of each hook end, an applicator roller rotating in a plane traversing the path of travel of said blank lateral edges and having a generally cylindriform periphery terminating in the direction of feed of said blanks in an abrupt drop shoulder and merging in the opposite direction into a hook lifting bevel, and means for maintaining a film of sealing compound on said roller periphery, said roller being disposed to contact said blank lateral edges whereby each leading lap portion will first engage said periphery and be coated thereby, then the associated hook will engage the bevel and be deflected outwardly with respect to the roller axis to place the hook in drag contact with said periphery for collecting sealing compound therefrom, and then said hook will abruptly pass over said abrupt shoulder and cause the associated trailing lap portion to engage and be coated by said periphery.

2. A sealing compound applying apparatus for body makers wherein container body blanks are fed along, each with a lateral edge thereof disposed in the direction of feed and equipped with a seam hook and a lap portion endwise of each hook end, an applicator roller rotating in a plane traversing the path of travel of said blank lateral edges and having a generally cylindriform periphery terminating in the direction of feed of said blanks in an abrupt drop shoulder and merging in the opposite direction into a hook lifting bevel, means for continuously and rapidly rotating said roller, and means for maintaining a film of sealing compound on said roller periphery, said roller being disposed below the path of travel of and in position to contact said blank lateral edges whereby each leading lap portion will first engage over said periphery and be coated thereby, then the associated hook will engage the bevel and be lifted thereby so as to place the hook in drag contact over said periphery for collecting sealing compound therefrom, and then said hook will abruptly drop over said abrupt shoulder and cause the associated trailing lap portion to rest upon and be coated by said periphery.

3. A sealing compound applying apparatus for body makers wherein container body blanks are fed along, each with a lateral edge thereof disposed in the direction of feed and equipped with a seam hook and a lap portion endwise of each hook end, an applicator roller rotating in a plane traversing the path of travel of said blank lateral edges and having a generally cylindriform periphery terminating in the direction of feed of said blanks in an abrupt drop shoulder and merging in the opposite direction into a hook lifting bevel, means for maintaining a film of sealing compound on said roller periphery, said roller being disposed to contact said blank lateral edges whereby each leading lap portion will first engage said periphery and be coated thereby, then the associated hook will engage the bevel and be deflected outwardly with respect to the roller axis to place the hook in drag contact with said periphery for collecting sealing compound therefrom, and then said hook will abruptly pass over said abrupt shoulder and cause the associated trailing lap portion to engage and be coated by said periphery, and means for yieldably pressing each blank lateral edge portion against said roller during the coating of its lap and lock portions thereby.

4. A sealing compound applying apparatus for body makers wherein container body blanks are fed along, each with a lateral edge thereof disposed in the direction of feed and equipped with a seam hook and a lap portion endwise of each hook end, an applicator roller rotating in a plane traversing the path of travel of said blank lateral edges and having a generally cylindriform periphery terminating in the direction of feed of said blanks in an abrupt drop shoulder and merging in the opposite direction into a hook lifting bevel, means for continuously and rapidly rotating said roller, means for maintaining a film of sealing compound on said roller periphery, said roller being disposed below the path of travel of and in position to contact said blank lateral edges whereby each leading lap portion will first engage over said periphery and be coated thereby, then the associated hook will engage the bevel and be lifted thereby so as to place the hook in drag contact over said periphery for collecting sealing compound therefrom, and then said hook will abruptly drop over said abrupt shoulder and cause the associated trailing lap portion to rest upon and be coated by said periphery, and means for yieldably pressing each blank lateral edge portion against said roller during the coating of its lap and lock portions thereby.

5. A sealing compound applying apparatus for body makers wherein container body blanks are fed along, each with a lateral edge thereof disposed in the direction of feed and equipped with a seam hook and a lap portion endwise of each hook end, an applicator roller rotating in a plane traversing the path of travel of said blank lateral edges and having a generally cylindriform periphery terminating in the direction of feed of said blanks in an abrupt drop shoulder and merging in the opposite direction into a hook lifting bevel, means for maintaining a film of sealing compound on said roller periphery, said roller being disposed to contact said blank lateral edges whereby each leading lap portion will first engage said periphery and be coated thereby, then the associated hook will engage the bevel and be deflected outwardly with respect to the roller axis to place the hook in drag contact with said periphery for collecting sealing compound therefrom, and then said hook will abruptly pass over said abrupt shoulder and cause the associated trailing lap portion to engage and be coated by said periphery, a presser roller freely-rotatably mounted above the path of travel of and disposed inwardly of said blank lateral edge portions and with its axis arranged transversely with respect to said path of travel, and means constantly urging said presser roller toward said blank edge portions.

6. A sealing compound applying apparatus for body makers wherein container body blanks are fed along, each with a lateral edge thereof disposed in the direction of feed and equipped with a seam hook and a lap portion endwise of each hook end, an applicator roller rotating in a plane traversing the path of travel of said blank lateral edges and having a generally cylindriform periphery terminating in the direction of feed of said blanks in an abrupt drop shoulder and merging in the opposite direction into a hook lifting bevel, means for maintaining a film of sealing compound on said roller periphery, said roller being disposed to contact said blank lateral edges whereby each leading lap portion will first engage said periphery and be coated thereby, then the associated hook will engage the bevel and be deflected outwardly with respect to the roller axis to place the hook in drag contact with said periphery for collecting sailing compound therefrom, and then said hook will abruptly pass over said abrupt shoulder and cause the associated trailing lap portion to engage and be coated by said periphery, a presser roller freely-rotatably mounted above the path of travel of and disposed inwardly of said blank lateral edge portions and with its axis arranged tranversely with respect to said path of travel, means constantly urging said presser roller toward said blank edge portions, and means confining said presser roller to a limited range of movement toward and from said blank edge portions.

7. A sealing compound applying apparatus for body makers wherein container body blanks are fed along, each with a lateral edge thereof disposed in the direction of feed and equipped with a seam hook and a lap portion endwise of each hook end, an applicator roller rotating in a plane traversing the path of travel of said blank lateral edges and having a generally cylindriform periphery terminating in the direction of feed of said blanks in an abrupt drop shoulder and merging in the opposite direction into a hook lifting bevel, means for maintaining a film of sealing compound on said roller periphery, and adjustable means for controlling the effective thickness of the film on said roller, said roller being disposed to contact said blank lateral edges whereby each leading lap portion will first engage said periphery and be coated thereby, then the associated hook will engage the bevel and be deflected outwardly with respect to the roller axis to place the hook in drag contact with said periphery for collecting sealing compound therefrom, and then said hook will abruptly pass over said abrupt shoulder and cause the associated trailing lap portion to engage and be coated by said periphery.

8. A sealing compound applying apparatus for body makers wherein container body blanks are fed along, each with a lateral edge thereof disposed in the direction of feed and equipped with a seam hook and a lap portion endwise of each hook end, an applicator roller rotating in a plane traversing the path of travel of said blank lateral edges and having a generally cylindriform periphery terminating in the direction of feed of said blanks in an abrupt drop shoulder and merging in the opposite direction into a hook lifting bevel, means for continuously and rapidly rotating said roller, means for maintaining a film of sealing compound on siad roller periphery, and adjustable means for controlling the effective thickness of the film on said roller, said roller being disposed below the path of travel of and in position to contact said blank lateral edges whereby each leading lap portion will first engage over said periphery and be coated thereby, then the associated hook will engage the bevel and be lifted thereby so as to place the hook in drag contact over said periphery for collecting sealing compound therefrom, and then said hook will abruptly drop over said abrupt shoulder and cause the associated trailing lap portion to rest upon and be coated by said periphery.

9. An apparatus as defined in claim 2 in which said film maintaining means comprises a receptacle in which the sealing compound is retained, said applicator roller being partially immersed in the sealing compound in said receptacle, and said receptacle including an apertured cover plate over which said blank lateral edge portions are fed and through which said applicator roll projects upwardly.

10. An apparatus as defined in claim 2 in which said film maintaining means comprises a receptacle in which the sealing compound is retained, said applicator roller being partially immersed in the sealing compound in said receptacle, said receptacle including an apertured cover plate over which said blank lateral edge portions are fed and through which said applicator roll projects upwardly, and there being included means for shifting the cover relative to said applicator roller so that an edge portion of the aperture therein will be spaced a greater or lesser distance from the roller and thereby control the thickness of the film of sealing compound carried through said aperture by the applicator roller.

11. An apparatus as defined in claim 2 in which said film maintaining means comprises a receptacle in which the sealing compound is retained, said applicator roller being partially immersed in the sealing compound in said receptacle, said apparatus also including a presser roller freely-rotatably mounted on said receptacle and above the path of travel of and disposed inwardly of said blank lateral edge portions and with its axis arranged transversely with respect to said path of travel, and means constantly urging said presser roller toward said blank edge portions.

12. An apparatus as defined in claim 2 in which said film maintaining means comprises a receptacle in which the sealing compound is retained, said applicator roller being partially immersed in the sealing compound in said receptacle, said apparatus also including a presser roller, a presser roller supporting arm, a shelf bracket mounted on the receptacle, means pivotally mounting said arm on said bracket in position for placing the presser roller above the path of travel of and inwardly of the blank lateral edge portions and with its axis arranged transversely with respect to said path of travel, and spring means interposed between the arm and the bracket for constantly urging the arm in a direction for pressing the presser roller against the blanks.

13. An apparatus as defined in claim 2 in which said film maintaining means comprises a receptacle in which the sealing compound is retained, said applicator roller being partially immersed in the sealing compound in said receptacle, and said receptacle including an apertured cover plate over which said blank lateral edge portions are fed and through which said applicator roll projects upwardly, and in which said roller rotating means includes a drive shaft, and a bearing bushing in which said shaft is mounted, said receptacle being rockably mounted on said bushing, and there being also included means to adjust the receptacle on its bushing mounting to alter the position of the applicator roller relative to the traveling body blanks.

14. An apparatus as defined in claim 2 in which said film maintaining means comprises a receptacle in which the sealing compound is retained, said applicator roller being partially immersed in the sealing compound in said receptacle, and said receptacle including an apertured cover plate over which said blank lateral edge portions are fed and through which said applicator roll projects upwardly, and in which said roller rotating means includes a drive shaft, and a bearing bushing in which said shaft is mounted, said receptacle being rockably mounted on said bushing, and there being also included means to adjust the receptacle on its bushing mounting to alter the position of the applicator roller relative to the traveling body blanks, said apparatus also including a presser roller, a presser roller supporting arm, a shelf bracket mounted on the receptacle, means pivotally mounting said arm on said bracket in position for placing the presser roller above the path of travel of and inwardly of the blank lateral edge portions and with its axis arranged transversely with respect to said path of travel, and spring means interposed between the arm and the bracket for constantly urging the arm in a direction for pressing the presser roller against the blanks.

JOHN HENCHERT.
CLAYTON P. BALL.